Figure 1:
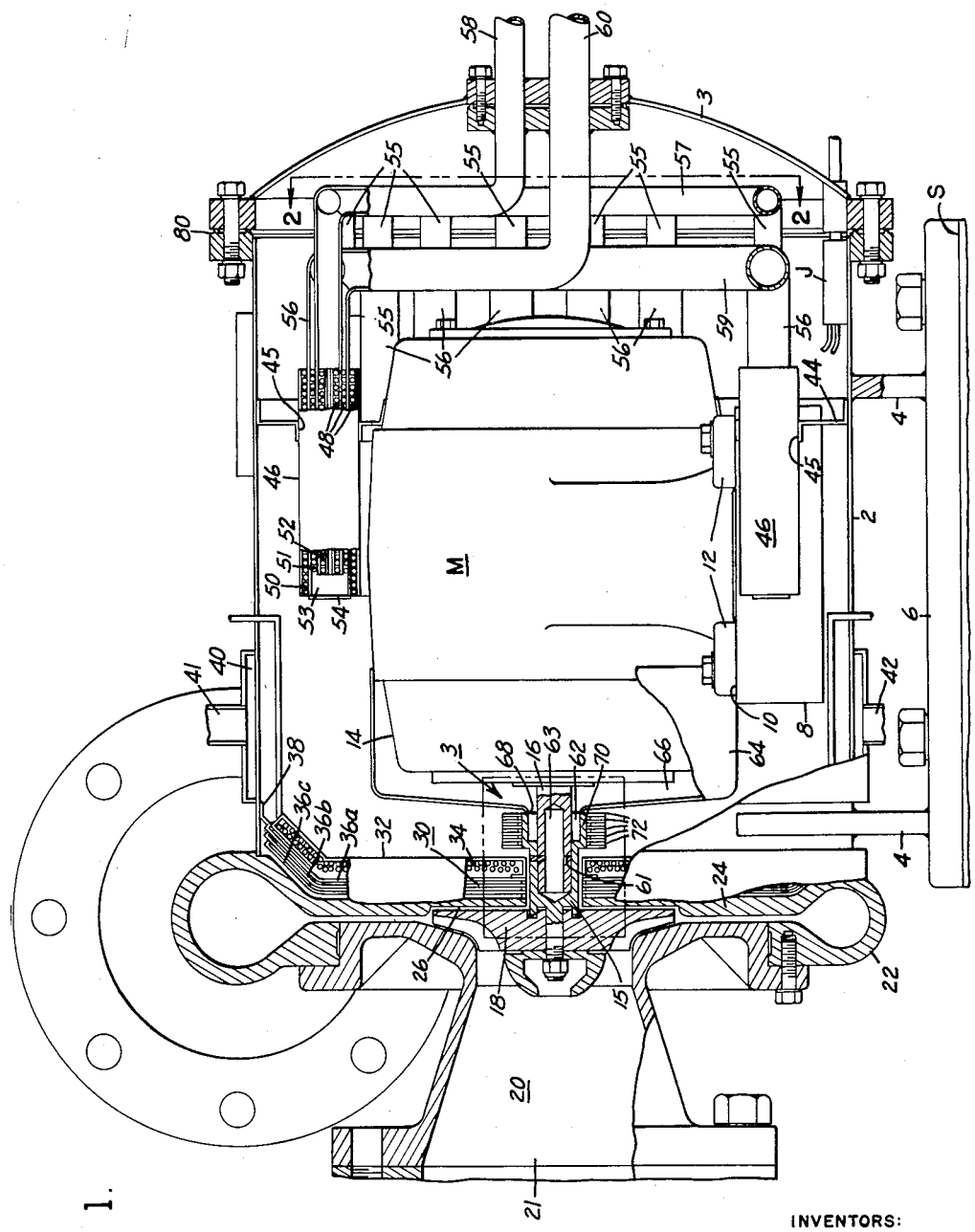

Nov. 13, 1962  LE ROY M. KROUSE ETAL  3,064,148
AUXILIARY MOTOR HOUSING
Filed May 23, 1958  2 Sheets-Sheet 1

INVENTORS:
LEROY M. KROUSE
WILLIAM A. ZECH
BY
*E. Wallace Brewster*
ATTORNEY

Nov. 13, 1962   LE ROY M. KROUSE ETAL   3,064,148
AUXILIARY MOTOR HOUSING
Filed May 23, 1958                      2 Sheets-Sheet 2

INVENTORS:
LEROY M. KROUSE
WILLIAM A. ZECH
BY
ATTORNEY

United States Patent Office 3,064,148
Patented Nov. 13, 1962

3,064,148
AUXILIARY MOTOR HOUSING
Le Roy M. Krouse, Buffalo, and William A. Zech, Kenmore, N.Y., assignors to Joy Manufacturing Company, Pittsburgh, Pa., a corporation of Pennsylvania
Filed May 23, 1958, Ser. No. 737,346
12 Claims. (Cl. 310—57)

Our invention relates to an auxiliary motor housing and more particularly to an auxiliary housing for enclosing a motor which housing has means for preventing the ambient temperature of the medium surrounding the motor from increasing to a level at which damage to the motor would occur.

At the present time there is a commercial demand for motors which are enclosed so that the medium surrounding the motor cannot be discharged to the atmosphere. Under such operating conditions the operating temperature of the motor is elevated substantially above its normal operating temperature so that it is necessary to provide some means, such as improved insulation, to prevent such elevated temperature from damaging the motor. In many installations the enclosed motor is also surrounded by a high temperature medium or subjected to a high temperature so that it is necessary to provide auxiliary cooling means for the motor. The effectiveness of such auxiliary cooling means determines the maximum temperature of the motor environment and to our knowldege no satisfactory devices have been developed to permit standard motors to be operated in an extremely high temperature environment.

Accordingly one object of our invention is to provide a new and improved auxiliary motor housing for enclosing a motor having novel means whereby the motor may be connected to an extremely high temperature driven means.

Another object of our invention is to provide a new and improved auxiliary housing for enclosing a motor which is formed to permit the surrounding medium to flow around and through the motor in a unidirectional path and which is provided with a plurality of cooling devices in said path.

Still another object of our invention is to provide a new and improved auxiliary housing for enclosing a motor which is formed to permit the surrounding medium to flow around and through the motor in a unidirectional path and which has a plurality of cooling devices in said path, one of which devices also constitutes a means for circulating the surrounding medium.

A more specific object of our invention is to provide a new and improved auxiliary housing for enclosing a motor which has a heat transfer device connected to its output shaft which additionally circulates the surrounding medium through the motor.

Still another object of our invention is to provide a new and improved auxiliary housing for enclosing a motor which housing has an open end over which a heat shield extends so that the motor may be supported closely adjacent a driven means operating at a temperature which would normally prevent the motor from operating satisfactorily.

Another specific object of our invention is to provide a new and improved auxiliary housing for enclosing a motor which housing has an open end with a plurality of spaced baffles extending thereacross and a heat sump is located adjacent the innermost baffle whereby the motor may be supported closely adjacent a driven means operating at a temperature which would normally prevent the motor from operating satisfactorily.

Still another more specific object of our invention is to provide a new and improved auxiliary housing for enclosing a motor which has its output shaft surrounded by a circulating device which includes a plate portion which functions as a heat exchanger.

Figure 2:
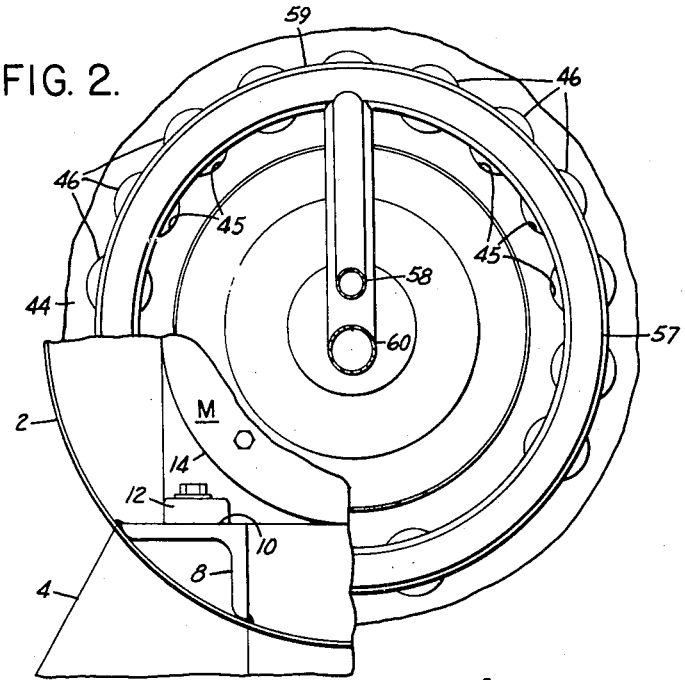
Figure 3:
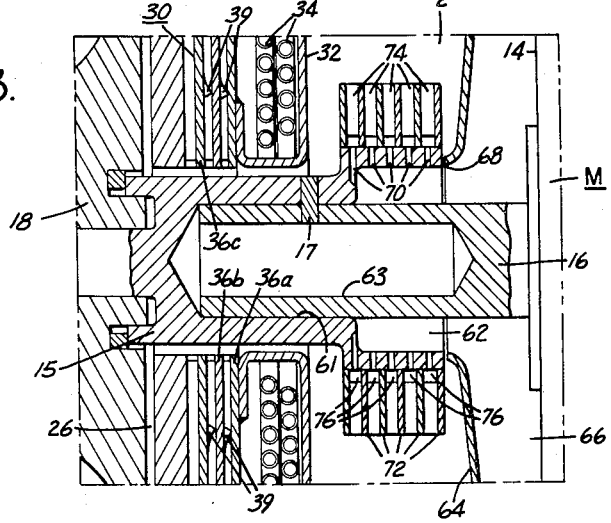
Figure 4:
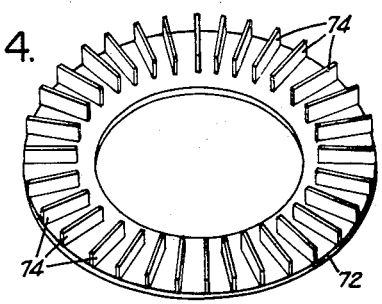

These and other objects of our invention will become more apparent upon consideration of the following detailed description of a preferred embodiment thereof when taken in conjunction with the following drawings, in which:

FIGURE 1 is a longitudinal cross sectional view of an auxiliary motor housing constructed in accordance with the principles of our invention having a motor located therein which is connected to an external driven means, FIGURE 2 is a cross sectional view of the assembly as shown in FIG. 1, taken generally along the line 2—2 thereof and with a quadrant portion thereof offset inwardly thereof, FIGURE 3 is an enlarged cross sectional view of the portion of the assembly as indicated in broken lines in FIGURE 1, FIGURE 4 is an enlarged perspective view of the heat exchanger portion of the connector shown in FIGURE 1.

Referring to FIGS. 1 and 2, it will be noted that an auxiliary motor housing constructed in accordance with the principles of our invention comprises an elongated horizontally extending tubular shell 2 having suitable longitudinally spaced cradles 4 rigidly secured thereto to support the shell 2 in fixed relationship above any suitable supporting surface S. If desired, the cradles 4 may be rigidly secured to a suitable base 6 which rests directly upon the surface S or is secured thereto in any suitable manner such as by being bolted thereto. As more clearly shown in FIG. 2 longitudinally extending laterally spaced supports 8 are rigidly secured to the intermediate portion of the inner wall of the shell 2 above the bottom of the shell to support a motor M rigidly therebetween and above. For the purpose of our invention the motor M may be of any suitable construction which is adapted for high temperature applications having a suitable housing 14 with a suitable rotatable output shaft 16 extending therefrom. Each support 8 is provided with a suitable upper supporting surface 10 to which the longitudinally and laterally spaced feet 12 of the housing 14 are rigidly secured in any suitable manner such as by bolting. As shown, the outer end of the shell 2 is sealed by means of a suitable head 3 suitably secured thereto and the motor M is secured to the supports 8 to be laterally centrally located within the shell 2 and longitudinally offset so that the output shaft 6 extends slightly beyond the open end of the shell 2. The motor M is electrically energized by means of a suitable sliding jack assembly J the outer portion of which is sealed to the head 3.

For the purposes of our invention an elongated formed connector 15 is rigidly secured to the outer end of the shaft 16 to rotate therewith. The end of the connector 15 remote from the motor M is rigidly secured to the rotatable member of any suitable driven device, which as illustrated comprises the impeller 18 of a centrifugal compressor 20. The compressor 20 may be of any suitable structure as is well known in the art having a suitable low pressure inlet 21 extending axially outwardly from the impeller 18 and a circular high pressure discharge scroll 22 located radially outward of the impeller 18. Although the compressor may be of any suitable construction since our auxiliary housing is intended for high temperature applications, the compressor 20 is preferably of a type capable of handling a high temperature medium such as a high temperature gas. The scroll 22 of the compressor 20 has an integral wall 24 which extends across and outwardly of the open end of the shell 2 and has a central clearance opening therein to permit the connector 15 to extend therethrough. The outer end of the shell 2 is circumferentially rigidly secured to the outer portion of the wall 24 to provide a continuous seal therebetween. As shown, the outwardly facing side of the wall 24 is spaced from the inwardly facing surface of the impeller 18 to provide a connecting passageway 26 (FIG. 3) whereby the pressure existing at the discharge end of the impeller 18 also exists within the adjacent end of the shell 2. In view of the fact that the medium passing through the compressor 20 is at an extreme elevated temperature the wall 24 is also at substantially the same elevated temperature. A circular heat shield 30 which extends across the open end of the shell 2 inwardly adjacent the wall 24 has been provided to prevent the high temperature of the wall 24 from overheating the motor M.

Referring to FIGS. 1 and 3 the heat shield 30 comprises an irregularly formed generally circular support 32 which extends across the open end of the shell 2 longitudinally and laterally inwardly adjacent the outer edge and which has a central clearance opening through which the intermediate portion of the connector 15 extends. It will be noted that the outer edge portion of the support 32 is bent inwardly of the shell 2 to conform to the side contour of the wall 24. The support 32 is provided to support a heat sump which may comprise any suitable cooling medium at a temperature substantially lower than that of the wall 24. For the purposes of our invention the heat sump comprises a tube 34 located on the outer side of the support 32 which is wound in a pair of overlapping spirals around the connector 15 and which extend across the open end of the shell 2. The opposite ends of the tube 34 are diametrically spaced from each other and extend longitudinally inwardly of and adjacent the inner surface of the shell 2 with their remote portions bent to extend outwardly of the shell 2 through suitable sealed openings. By such construction suitable coolant flow connections may be made to the ends of the tube 34 externally of the shell 2. As the tube 34 is secured only to the shell 2 at its inlet and outlet portions the double spiral intermediate portion of the tube 34 may freely expand and contract as its temperature changes.

The heat shield 30 also comprises a plurality of heat baffles 36a, 36b and 36c which extend across the open end of the shell 2 and have suitable central clearance openings through which the intermediate portion of the connector 15 extends. The baffles 36a, 36b and 36c are spaced longitudinally of the shell 2 between the wall 24 and the spiral portions of the tube 34 and are employed to control the rate of heat flow from the wall 24 to the tube 34. The baffle 36a is located immediately adjacent the spiral portions of the tube 34 and has its outer edge formed to provide an integral leg 38 which is rigidly circumferentially sealed to the adjacent inner surface of the shell 2 and the adjacent outer end of the support 32. The central portions of the support 32 and the baffle 36a are also circumferentially rigidly sealed together. The baffle 36b is held in spaced relationship to the baffle 36a in any suitable manner such as by providing integral lugs 39 in at least triangular spaced relationship about the connector 15 which extend inwardly into engagement with the adjacent outer surface of the baffle 36a. In a similar manner the baffle 36c may be spaced from the baffle 36b. Although it is to be realized that some heat transfer will occur directly from one baffle 36 to another due to such direct engagement of the spacing lugs 39 it will be appreciated that such a heat transfer is small due to the small area of engagement therebetween.

In view of the fact that the outer end of the shell 2 is secured to the outer portion of the wall 24 direct heat transfer will occur therebetween. In order to prevent such heat transfer from heating the medium within the shell 2 a suitable jacket 40 is provided around the outer surface of the shell 2 adjacent the inner end of the leg 38 through which a suitable coolant, such as water, may flow to cool the outer end of the shell 2. Although as shown a single annular jacket 40 is employed having an inlet 41 diametrically spaced from an outlet 42, if desired, a counterflow type of jacket may be employed with the inlet 41 and outlet 42 being located closely adjacent each other.

With the heretofore described structure it will be obvious that due to the temperature gradient between the wall 24 and the spiral portions of the tube 34 that heat will flow therebetween. The amount of such heat transfer is dependent upon the temperature gradient therebetween and upon the transfer coefficient of the plurality of the baffles 36. By providing the spaced baffles 36, radiant and connective heat transfer from the wall 24 is restricted from entering the shell 2 and a temperature gradient occurs between the wall 24 and the adjacent baffle 36c, the baffle 36c and the adjacent baffle 36b, the baffle 36b and the baffle 36a, and the baffle 36a and the spiral portions of the tube 34. Under normal operating conditions a steady temperature gradient exists between the wall 24 and the spiral portion of the tube 34 so that the total quantity of heat transferred from the wall 24 to the baffle 36c per unit of time is equal to the total quantity of heat transferred per unit of time by the baffle 36c to the baffle 36b, by the baffle 36b to the baffle 36a, and by the baffle 36a to the spiral portion of the tube 34 and each baffle will achieve a steady temperature intermediate the temperature of the wall 24 and the spiral portion of the tube 34. In view of the fact, however, that such heat transfer between adjacent components is directionally proportional to the difference between the temperatures to the fourth power of the adjacent components i.e. $(T_1^4 - T_2^4)$ the total quantity of heat transferred by the wall 24 to the spiral portion of the tube 34 is substantially restricted by the baffles 36a, 36b and 36c. Accordingly by providing baffles 36a, 36b and 36c the spiral portion of the tube 34 may be maintained at a substantially lower temperature than the operating temperature of the wall 24 by employing generally available coolant such as water at a normal rate of flow therethrough and the heat transfer from the spiral portion of the tube 34 to atmosphere within the shell 2 is sufficiently low that it will not cause damage to the motor M. Although only three baffles 36 have been shown and described, if desired a greater number of baffles 36 may be employed whereby a greater temperature gradient can be maintained between the wall 24 and the spiral portions of the tube 34 without requiring any change in the coolant in the tube 34.

The ability of the baffles 36a, 36b and 36c to so restrict the heat transfer is well illustrated by the following calculated results which are based upon a normally expected wall 24 temperature of 1400° F. and a water temperature of 150° F. Under these assumptions 25,700 B.t.u.'s per hour are transferred by the wall 24 to the water in the spiral portion of the tube 34 when no baffles are used which causes the spiral portion of the tube 34 to achieve such an elevated temperature that a substantial amount of heat is transferred to the medium within the shell 2. By employing the baffles 36a, 36b and 36c under the same operating conditions only 6440 B.t.u.'s per hour are so transferred and the heat transfer by the spiral portion of the tube 34 to the medium within the shell 2 is substantially reduced.

Although as heretofore described any suitable type of motor M may be employed in our invention, it is to be noted that the housing 14 is of a standard hollow elongated construction whereby a surrounding medium may flow therethrough only from one end to the other. Accordingly in order to compartmentalize the shell 2 with reference to the motor M an annular support 44 is provided which extends radially between the outer surface of the housing 14 and the radially adjacent inner side of the shell 2. As shown the support 44 is longitudinally offset from the center of the shell 2 toward the head 3. The support 44 is provided with a plurality of openings 45 in each of which an elongated cylindrical heat exchanger 46 is rigidly secured to extend longitudinally within the shell 2. In order to insure that the medium surrounding the motor M passes through the heat exchangers 46 the support 44 is circumferentially sealed to the outer surface of the housing 14, the outer surface of the heat exchangers 46, and the inner surface of the shell 2.

Although various types of heat exchangers may be employed, each heat exchanger 46 comprises a plurality of concentric, elongated thin walled heat conducting tubes which define longitudinally extending concentric annular fluid flow paths 50, 51 and 52 for permitting fluid flow therethrough and each of which are preferably provided with suitable coils 48 to facilitate the heat exchange between the flow paths. Various flow paths may be employed for each path, however, as shown the outer annular flow path 50 is open at each of its ends whereby the medium surrounding the motor M flows from the inner shaft end of the motor M, through the annular passage 50 to the outer end of the motor M and thereafter through the hollow housing 14 of the motor M back to the inner shaft end. The inner ends of the inner flow paths 51, 52 are spaced longitudinally towards the head 3 from the inner end of the flow path 50 and the inner diameter of the tube forming the inner side of the path 50 is sealed by means of a plate 54 extending thereacross whereby a coolant reversing chamber 53 is formed at the inner end of each heat exchanger 46.

The innermost flow paths 52 are connected to suitable arcuately spaced longitudinally extending inlet lines 55, respectively, and the intermediate flow paths 51 are connected to suitable arcuately spaced longitudinally extending outlet lines 56 which are concentric with and surround the supply lines 55, respectively. In order to supply coolant to each inlet line 55 an annular header 57 is located between the head 3 and the outer end of the motor M which is connected to the outer end of each line 55. The header 57 is also connected to a longitudinally outwardly extending source line 58 which extends axially outwardly of the head 3 to permit a suitable coolant supply (not shown), such as water, to be secured thereto in any suitable manner. In a similar manner an annular outlet header 59 is located between the outer end of the motor M and the annular header 57 which is connected to the outer end of each of the outlet lines 56. The annular outlet header 59 is also connected to an axially outwardly extending line 60 which is connectible to a suitable drain (not shown) in any suitable manner. The lines 58, 60 are suitably secured to the head 3 to prevent leakage of any medium from or into the shell 2. With such a heat exchanger construction pressurized coolant flows from the supply line 58 to the annular supply header 57, then to each of the inlet lines 55, through the inner path 52 of the heat exchanger 46, through the reversing chamber 53 and outwardly through the intermediate path 51 of the heat exchanger 46, through the outlet lines 56 to the outlet header 59, and then to the outlet drain line 60.

In order to insure that the medium within the shell 2 is circulated in the heretofore described manner the connector 15 is provided with an integral circulating means in the gas flow path. As shown the intermediate portion of the connector 15 is provided with a longitudinally extending bore 61 which is closely received on the outer end of the shaft 16 and is rigidly secured thereto in any suitable manner such as by a dowel 17 extending laterally therethrough. The elongated end portion of the connector 15 adjacent the motor M is radially spaced outwardly adjacent the intermediate portion of the shaft 16 to form an elongated annular chamber 62 therebetween having an open end facing the motor M and which open end is spaced outwardly from the housing 14. In order to provide a restricted heat flow path for heat transfer from the engaged portions of the connector 15 and the shaft 16, the shaft 16 is provided with a central opening 63 extending inwardly from its outer end which is slightly greater in diameter than the radius of the shaft 16. A dish-shaped baffle 64 is rigidly circumferentially sealed to the outer surface of the inner end of the motor M to form a chamber 66 at the inner end of the motor M. The central portion of the baffle 64 is provided with an outwardly flanged opening 68 with the circular end thereof located closely adjacent the circular end of the adjacent portion of the connector 15 so that the chamber 66 is connected to the chamber 62.

Inasmuch as the impeller 18 is at an elevated temperature it will be readily appreciated that the connector 15 will also be at an elevated temperature as it is directly connected thereto. Such heat flow will flow through the central portion of the connector 15 to the circulating portion thereof. A certain amount of heat will also flow from the central portion of the connector 15 to the output shaft 16, however, such flow will be limited due to the heat barrier therebetween formed by engagement of the bore 61 with the outer surface of the shaft 16 and the restricted section of the shaft 16 in engagement therewith.

Referring to FIGURES 3 and 4 it will be noted that a plurality of annular members 72 are rigidly secured to the circulating portion of the connector 15 to extend outwardly around the outer surface thereof and that the elongated circulating portion of the connector 15 is provided with a plurality of longitudinally spaced rows of radially extending arcuately spaced openings 70 with a row of openings 70 being located between adjacent members 72. Each annular member 72 has a plurality of rectangular cross members 74 rigidly secured thereto which are arcuately spaced from each other and which extend both radially and laterally outwardly therefrom. When assembled together each cross member 74 is secured to the adjacent member 72 to provide a plurality of adjacent quadrilateral chambers between adjacent members 72. Inasmuch as the number of openings 70 which can be provided in each row of openings 70 is limited to prevent weakening the circulating portion of the connector 15, the inner end of each cross member 74 is spaced radially outwardly from the outer surface of the circulating portion of the connector 15 to provide an annular chamber 76 between adjacent members 72 outwardly adjacent the outer surface of the circulating portion of the connector 15.

Since the connector 15 rotates with the shaft 16 the circulating portion of the connector 15 and the members 72 and 74 function as a positive pressure pump to evacuate the medium from the chamber 62 and discharge such medium into the higher pressure of the shell 2. Thus upon rotation of the shaft 16, the medium within the chamber 62 is initially drawn through the openings 70 and discharged into the chambers 76 from which is discharged outwardly through the quadrilateral chambers formed by the members 72—74. As is well known with such centrifugal types of pumps the quantity of air discharged is determined by the diameter and number of the openings 70 and the length of the radial passageway through which the pumped medium passes. Accordingly, the openings 70 and the members 72—74 are provided with a structure to circulate the desired quantity of medium therethrough. Of importance with reference to our invention is the fact that the medium pumped from the chamber 62 to the shell 2 by the heretofore pumping structure also constitutes a cooling means to reduce the heat transfer from the connector 15 to the shaft 16. As indicated heat is transferred from the impeller 18 to elevate the temperature of the connector 15. Since the members 72 and 74 are directly connected to the circulating portion of the connector 15 such heat transfer causes the members 72 and 74 to achieve an elevated temperature; however, due to the flow of the circulating medium along the sides of the members 72 and 74 the members 72 and 74 are cooled.

It will also be noted that the heretofore described pumping structure also insures positive unidirectional circulation of the medium within the shell 2. Thus, since the chamber 62 is evacuated a medium circulating path is established within the shell 2 from the high pressure side of the pumping structure within the shell 2, through the heat exchangers 46, within the outer portion of the shell 2, through the housing of the motor M, into the chamber 66, and then to the chamber 62 on the low pressure side of the pumping structure. With such a circulating path the circulating medium flowing through the housing of the motor M is below the temperature of the medium within the inner portion of the shell 2 so that the motor M is continuously cooled by such circulating medium. Although the components of the motor M elevate the temperature of the circulating medium flowing therethrough the heat exchangers 46 are provided with sufficient capacity to insure that such heat transfer does not elevate the temperature of the circulating medium to the point where the circulating medium cannot function to cool the members 72—74.

Throughout this specification various parts have been indicated as sealed to other parts. Inasmuch as our auxiliary housing is primarily intended for elevated temperature applications the components described herein are formed from a material which is suitable for its intended purpose at such elevated temperatures. Components such as the shell 2 and the connector 15 are formed from stainless steel whereby such sealing may readily be accomplished by welding. Further it will be noted that the head 3 is sealed to the shell 2 by means of suitable sealing flanges 80 as are well known in the art.

With the structure as heretofore described the motor M is readily adapted to operate at an environment temperature substantially below that at which the driven means, that is the compressor 20, is operating. The direct heat flow from the wall 24 of the compressor 20 towards the motor M is prevented from elevating the ambient temperatures of the motor M by means of the heat shield 30. The shell 2 is prevented from reaching the elevated temperatures of the high pressure medium of the compressor 20 by means of the annular water jacket 40 at its open end. It will be noted, however, that due to the passageway 26 and the clearance openings in the wall 24, the baffles 36 and the support 32 the high temperature and pressure medium passing through the compressor 20 will also enter the shell 2 at the shaft end of the motor M. Such high temperature medium is circulated by means of the circulating portion of the connector 15 as heretofore described so that it passes through the passageway 50 of the heat exchanger 46 and is cooled thereby. At the same time the direct heat transfer from the compressor 18 to the connector 15 is dissipated by means of the members 72 and 74 over which the medium flowing through the opening 70 passes to insure continued cooling thereof.

Having described a preferred embodiment of our invention in accordance with the patent statutes, it is to be realized that modifications thereof may be made without departing from the broad spirit of our invention; accordingly, it is respectfully requested that our invention be interpreted as broadly as possible and as limited only by the prior art.

What we claim is:

1. An auxiliary housing for enclosing a hollow housing device which is subject to failure when operated at a temperature above its normal operating temperature comprising, a hollow shell having an opening therein, means within said shell for supporting such a device closely adjacent said opening, a support member extending across said opening and having an outer periphery sealed to said shell to prevent leakage of a medium within said shell around said support member, a heat sump supported by said support member on the side thereof remote from said supporting means, a plurality of means spaced outwardly from each other and said heat sump on said side of said support member to provide a heat shield between said heat sump and a source of heat well above such a normal operating temperature located closely adjacent and outwardly of said plurality of means, a support peripherally sealed to a portion of the inner surface of said shell spaced from said opening, said support extending inwardly of said shell and having an inner opening adapted to be peripherally sealed to the housing of such a device, and at least one heat exchanger extending through said support having a path therein to permit a circulating medium to flow from one side of said support to the other.

2. An auxiliary housing comprising, a hollow shell having an opening therein, means supporting a hollow housing motor within said shell closely adjacent said opening which is subject to failure when operated at a temperature above its normal operating temperature, a support member extending across said opening and having an outer periphery sealed to said shell to prevent leakage of a medium within said shell around said support member, a heat sump supported by said support member on the side thereof remote from said supporting means, a plurality of means spaced outwardly from each other and said heat sump on said side of said support member to provide a heat shield between said heat sump and a source of heat well above such a normal operating temperature located closely adjacent and outwardly of said plurality of means, a support within said shell spaced from said opening having outer and inner surfaces peripherally sealed to the inner surface of said shell and an inner portion of said motor housing, respectively, at least one heat exchanger extending through said support having a path therein to permit a circulating medium to flow from one side of said support to the other, said motor having an elongated rotatable output shaft with an elongated connector secured thereto, said connector having an elongated end portion adjacent said motor housing spaced outwardly of said shaft to provide a chamber extending along the outer surface of said shaft with the outer edge thereof located closely adjacent the edge defining the opening of said motor housing facing the open end of said shell, and means in said connector to circulate a fluid medium from said chamber into said shell.

3. An auxiliary housing comprising, a hollow shell having an opening therein, means supporting a hollow housing motor within said shell closely adjacent said opening which is subject to failure when operated at a temperature above its normal operating temperature, a support member extending across said opening and having an outer periphery sealed to said shell to prevent leakage of a medium within said shell around said support member, a heat sump supported by said support member on the side thereof remote from said supporting means, a plurality of means spaced outwardly from each other and said heat sump on said side of said support member to provide a heat shield between said heat sump and a source of heat well above such a normal operating temperature located closely adjacent and outwardly of said plurality of means, said motor having an elongated rotatable output shaft with an elongated connector secured thereto, said connector having an elongated end portion adjacent said motor housing spaced outwardly of said shaft to provide a chamber extending along the outer surface of said shaft with the outer edge thereof located closely adjacent the edge defining the opening of said motor housing facing the open end of said shell, and means in said connector to circulate a fluid medium from said chamber into said shell.

4. An auxiliary housing comprising, a hollow shell having an opening therein, means within said shell for supporting a device closely adjacent said opening which device is subject to failure when operated at a temperature above its normal operating temperature, a support member extending across said opening and having an outer periphery sealed to said shell to prevent leakage of a medium within said shell around said support member, a heat sump supported by said support member on the side thereof remote from said supporting means, and a plurality of means spaced outwardly from each other and said heat sump on said side of said support member to provide a heat shield between said heat sump and a source of heat well above such a normal operating temperature located closely adjacent and outwardly of said plurality of means.

5. An auxiliary housing comprising, a hollow shell having an opening therein, means within said shell for supporting a device closely adjacent said opening which device is subject to failure when operated at a temperature above its normal operating temperature, a support member extending across said opening and having an outer periphery sealed to said shell to prevent leakage of a medium within said shell around said support member, a heat sump comprising a fluid circulating tube movably supported by said support member on the side thereof remote from said supporting means, and a plurality of means spaced outwardly from each other and said heat sump on said side of said support member to provide a heat shield between said heat sump and a source of heat well above such a normal operating temperature located closely adjacent and outwardly of said plurality of means.

6. An auxiliary housing comprising, a hollow shell having an opening therein, means within said shell for supporting a device closely adjacent said opening which device is subject to failure when operated at a temperature above its normal operating temperature, a support member extending across said opening and having an outer periphery sealed to said shell to prevent leakage of a medium within said shell around said support member, a heat sump supported by said support member on the side thereof remote from said supporting means, a plurality of means spaced outwardly from each other and said heat sump on said side of said support member to provide a heat shield between said heat sump and a source of heat well above such a normal operating temperature located closely adjacent and outwardly of said plurality of means, and each of said plurality of means comprising a plate member having an outer periphery of a size to overlap said support member.

7. An auxiliary housing comprising, a hollow shell having an opening therein, means within said shell supporting a device closely adjacent said opening which device is subject to failure when operated at a temperature above its normal operating temperature, a support member extending across said opening and having an outer periphery sealed to said shell to prevent leakage of a medium within said shell around said support member, a heat sump supported by said support member on the side thereof remote from said supporting means, a plurality of means spaced outwardly from each other and said heat sump on said side of said support member to provide a heat shield between said heat sump and a source of heat well above such a normal operating temperature located closely adjacent and outwardly of said plurality of means, and each of said plurality of means located outwardly of the one of said plurality of means adjacent said heat sump having integral means for locating said plurality of means in spaced relationship.

8. An auxiliary housing for enclosing a motor comprising, an elongated cup-shaped shell having means for supporting a motor closely inwardly adjacent the open end thereof, a heat shield comprising a plurality of components each extending across the open end of said shell in axially spaced relationship, said components having axially aligned openings to permit the output shaft of such a motor to freely extend outwardly of said shell, one of said components having its outer edge peripherally sealed to the inner surface of said shell to prevent leakage of a medium within said shell around the outer portion of a component of said heat shield located innermost of said shell, said inner most component comprising a formed plate member for supporting another of said components comprising a fluid circulating heat sump, and the remainder of said components comprising a plurality of heat baffles spaced outwardly from said sump and each other, respectively, whereby the outermost one of said baffles may be located closely adjacent means existing at an elevated temperature.

9. An auxiliary housing for enclosing a motor comprising, an elongated cup-shaped shell having means for supporting a motor closely inwardly adjacent the open end thereof, a heat shield comprising a plurality of components each extending across the open end of said shell in axially spaced relationship, said components having axially aligned openings to permit the output shaft of such a motor to freely extentd outwardly of said shell, one of said components having its outer edge peripherally sealed to the inner surface of said shell to prevent leakage of a medium within said shell around the outer portion of a component of said heat shield located innermost of said shell, another of said components comprising a spiral fluid circulating tube, said innermost components comprising a formed plate member for freely supporting said other spiral component for movement radially of said shell, and the remainder of said components comprising a plurality of heat baffles spaced outwardly from said sump and each other, respectively, whereby the outermost one of said baffles may be located closely adjacent means existing at an elevated temperature.

10. An auxiliary housing for enclosing a hollow housing motor comprising, a cup-shaped shell having means for supporting such a motor therein, an annular support peripherally sealed to the inner surface of said shell in spaced relationship to the closed end thereof, said support extending inwardly of said shell and having an inner opening adapted to be peripherally sealed to the housing of such a motor, at least one heat exchanger extending through said support having a path therein to permit a circulating medium to flow from one side of said support to the other, a heat shield extending across the open end of said shell which is peripherally sealed to said inner surface thereof, and said shield having a central opening therein for permitting a shaft to extend therethrough.

11. An auxiliary motor housing comprising, an elongated cup-shaped shell having means for supporting an elongated hollow housing motor intermediately thereof with the open ends of said motor housing being spaced longitudinally within said shell, a support spaced from the closed end of said shell having outer and inner surfaces peripherally sealed to the inner surface of said shell and an inner portion of said motor housing, respectively, at least one heat exchanger extending through said support having a path therein to permit a circulating medium to flow from one side of said support to the other, said motor having an elongated rotatable output shaft extending towards the open end of said shell with an elongated connector secured thereto, said connector having an elongated end portion adjacent said motor housing spaced outwardly of said shaft to provide a chamber extending along the outer surface of said shaft with the outer edge thereof located closely adjacent the edge defining the opening of said motor housing facing the open end of said shell, and means in said connector to circulate a fluid medium from said chamber into said shell.

12. An auxiliary motor housing comprising, an elongated cup-shaped shell having means for supporting an elongated hollow housing motor intermediately thereof with the open ends of said motor housing being spaced longitudinally within said shell, a support spaced from the closed end of said shell having outer and inner surfaces peripherally sealed to the inner surface of said shell and an inner portion of said motor housing, respectively, at least one heat exchanger extending through said support having a path therein to permit a circulating medium to flow from one side of said support to the other, said motor having an elongated rotatable output shaft extending towards the open end of said shell with an elongated connector secured thereto, said connector having an elongated end portion adjacent said motor housing spaced outwardly of said shaft to provide a chamber extending along the outer surface of said shaft with the outer edge thereof located closely adjacent the edge defining the opening of said motor housing facing the open end of said shell, means in said connector to circulate a fluid medium from said chamber into said shell, a heat shield extending across the open end of said shell which is peripherally sealed to said inner surface thereof, and said shield having a central opening therein for permitting a portion of said connector to extend freely therethrough.

References Cited in the file of this patent

UNITED STATES PATENTS

| | | |
|---|---|---|
| 2,226,986 | Wechsberg | Dec. 31, 1940 |
| 2,260,042 | McMahan | Oct. 21, 1941 |
| 2,372,135 | Sterrett | Mar. 20, 1945 |
| 2,377,937 | Hervert | June 12, 1945 |
| 2,460,752 | Jacobsen | Feb. 1, 1949 |
| 2,694,157 | Cone | Nov. 9, 1954 |
| 2,780,739 | Baudry | Feb. 5, 1957 |
| 2,885,963 | Ivanoff | May 12, 1959 |

FOREIGN PATENTS

| | | |
|---|---|---|
| 61,765 | Switzerland | May 30, 1912 |